United States Patent [19]
Moore et al.

[11] Patent Number: 5,280,968
[45] Date of Patent: Jan. 25, 1994

[54] PIVOT PIN CONSTRUCTION FOR GIMBAL JOINT ASSEMBLY

[75] Inventors: Arthur L. Moore, Canyon Country; Peter Wolff, Santa Monica, both of Calif.

[73] Assignee: Stainless Steel Products, Inc., Burbank, Calif.

[21] Appl. No.: 846,981

[22] Filed: Mar. 9, 1992

Related U.S. Application Data

[63] Continuation-in-part of Ser. No. 597,198, Oct. 10, 1990, abandoned.

[51] Int. Cl.$^5$ .................................................. F16L 7/00
[52] U.S. Cl. ...................................... 285/94; 285/226; 285/265; 285/286; 285/422
[58] Field of Search ................. 285/94, 264, 265, 226, 285/923, 422

[56] References Cited

U.S. PATENT DOCUMENTS

| | | | |
|---|---|---|---|
| 777,306 | 12/1904 | Rawlinson | 285/94 X |
| 2,608,385 | 8/1952 | Stahl | 285/94 |
| 3,112,129 | 11/1963 | Willis et al. | 285/226 |

*Primary Examiner*—Dave W. Arola
*Attorney, Agent, or Firm*—Harlan P. Huebner

[57] ABSTRACT

A pivot pin for use in joint assemblies for ducting and, more particularly, relating to pivot pins interfitting into gimbal joints used to flexibly connect sections of high pressure aircraft ducting together so that said sections of ducting may rotate at said joints relative to each other. There is a reservoir for lubricant integrally formed in the pivot pin and located so that lubricant can seap into the bore into which the pivot pin has been inserted.

7 Claims, 3 Drawing Sheets

PIVOT PIN CONSTRUCTION FOR GIMBAL JOINT ASSEMBLY

This is a continuation in part of application Ser. No. 07/597,198, filed Oct. 10, 1990 and now abandoned.

BACKGROUND OF THE INVENTION

1. Field of the Invention

This invention relates to joint assemblies for ducting and, more particularly, to pivot pins interfitting into gimbal joints used to flexibly connect sections of high pressure aircraft ducting together so that the sections of ducting can swivel at the joints relative to each other in a manner permitted by the invention that greatly reduces the degree of frictional stress in the joint.

2. Background of the Invention

In the aerospace industry, high pressure ducting must be flexible to accommodate the irregular internal passages of the various aircraft in which the ducting is used. To meet this requirement, sections of ducting are connected together using conventional gimbal joints. Gimbal joints provide the necessary flexibility during installation of the ducting in the aircraft. Such joints also allow the ducting limited freedom of movement when the ducting is subject to environmental stresses when the aircraft is in service.

For example, high temperatures within the ducting caused by the aircraft's hot exhaust passing through the ducting can be a substantial source of environmental stress on the ducting and joints. Fluctuations in pressure can also cause stress on the ducting and joints. To respond to such environmental pressures, the joints in the ducting are designed to allow angular fluctuations. In this way, some of the stress is released in the form of rotational movement about the axis of the joints.

The problem with this approach is that the frictional forces within the joint, which are located between the surface of the pivot pin and the walls of the joint, resist the rotational movement. These frictional forces must be overcome as joint rotation occurs. The environmental stresses are sufficient to overcome the frictional forces within the joint, however, the joint suffers as a result. In fact, the repeated frictional strain in the joint has a cumulative effect. After prolonged use, the pivot pin becomes fatigued and breaks. When breakage of the pivot pin occurs, the environmental stresses that would normally be harmlessly released in the form of rotation energy about the joint build up within the ducting causing possible fatigue and failure of other components of the ducting system.

To overcome this problem of pivot joint failure in the prior art, the present invention reduces the level of harmful friction within the joint by providing a means for continuously lubricating the joint. The pivot pin of the present invention has two structural features that accomplish this goal. The first is a reservoir located at the base of the head of the pivot pin. The reservoir is filled with lubricant when it is installed. As there is rotation about the pin pivots, small quantities of lubricant are released and leak into the joint. The rate of leakage of lubricant into the joint is expected to meet the needs of the joint over the life of the joint.

The second unique structural feature of the pivot pin of the present invention relates to the surface of a rod portion of the pivot pin. The surface of the rod portion is textured. By providing a textured surface, the lubricant released from the reservoir is captured within the depressions of the textured surface of the rod. In this way, the lubricant is trapped between the surface of the rod and the interior walls of the bore of the joint into which the rod of the pivot pin fits. Thus, the lubricant is localized where it will do the most good to reduce friction within the joint. By the structural combination of a lubricant reservoir and textured surface, the frequency of pivot pin failure caused by friction within the joint can be substantially reduced.

SUMMARY OF THE INVENTION

It is the purpose of the present invention to provide a pivot pin for gimbal joints that will reduce the level of friction within the joint during rotation.

Another object of the present invention is to provide a pivot pin having a reservoir at the base of the head of the pin for holding lubricant that can seap into the joint as needed to lubricate the joint.

Another object of the present invention is to provide a pivot pin having a rod with a textured surface so that lubricant positioned within the joint will be captured by the depressions in the textured surface for maximum utilization of the lubricant within the joint and to minimize leakage of the lubricant from the joint.

It is still another object of the present invention to combined the lubricant reservoir and textured surface of the rod in one pivot pin to maximize lubrication and minimize friction within the joint.

BRIEF DESCRIPTION OF THE DRAWINGS

The advantages of the invention can be more clearly understood by reference to the drawings in which.

DETAILED DESCRIPTION OF THE PREFERRED EMBODIMENT

Figure 1:
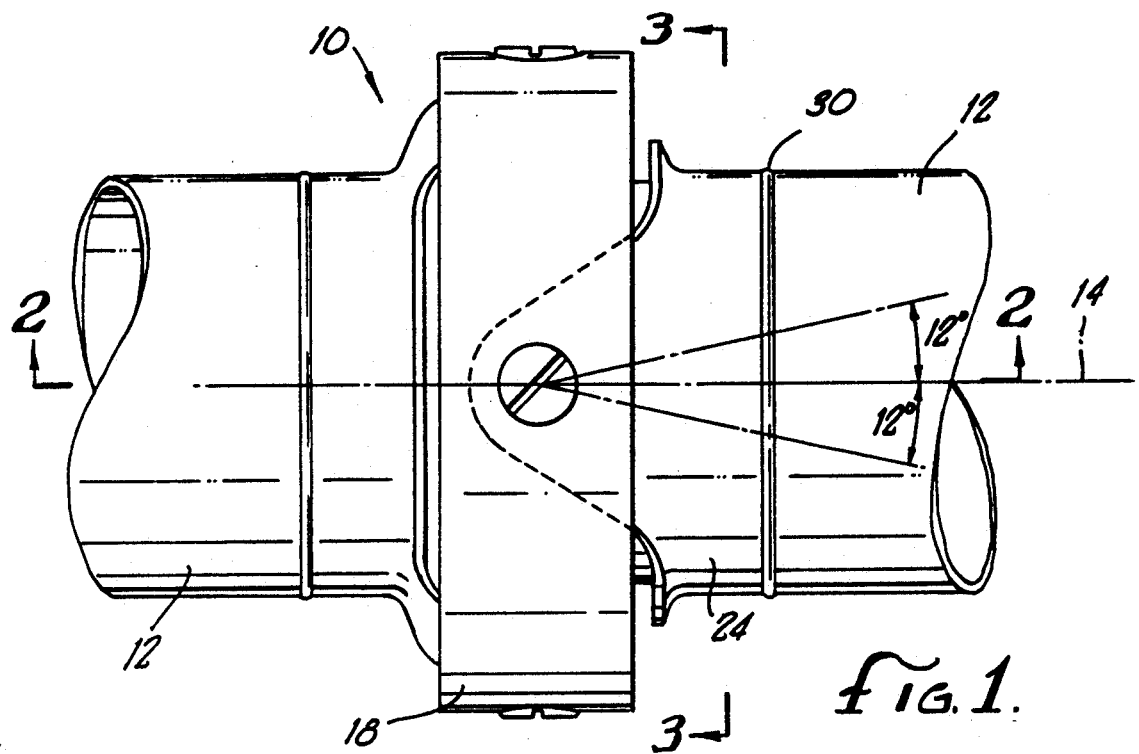
FIG. 1 is an exterior side elevational view of two sections of ducting connected by a gimbal joint employing the new pivot pin.
Figure 2:
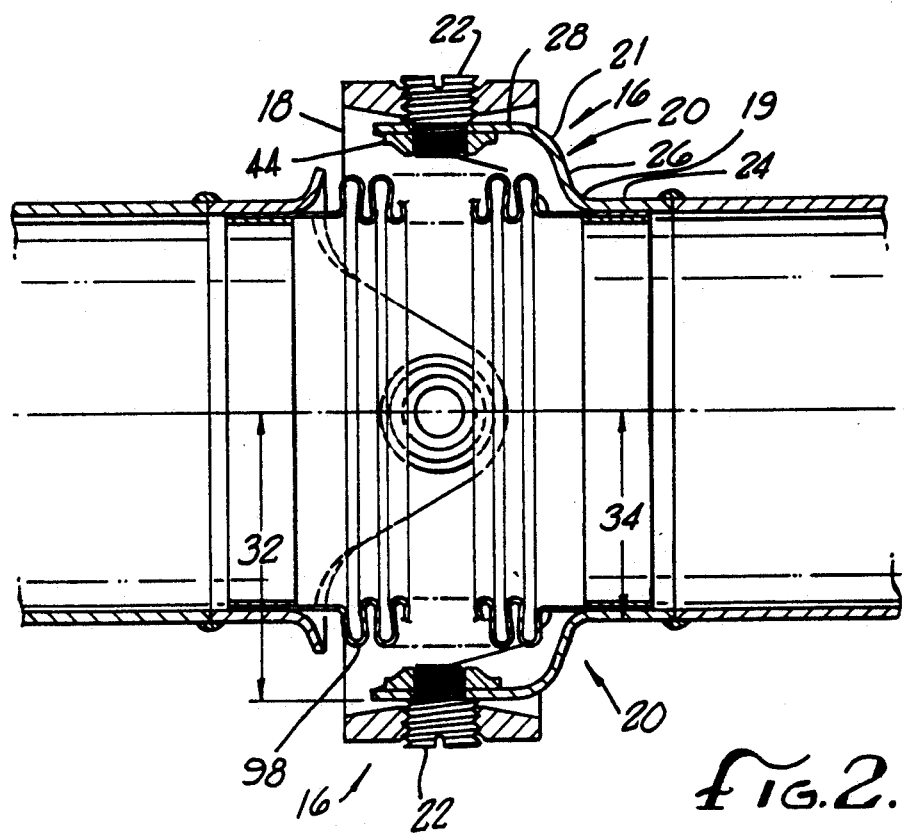
FIG. 2 is a cross-sectional view of the gimbal joint employing the new pivot pin taken along line 2—2 of FIG. 1.
Figure 3:
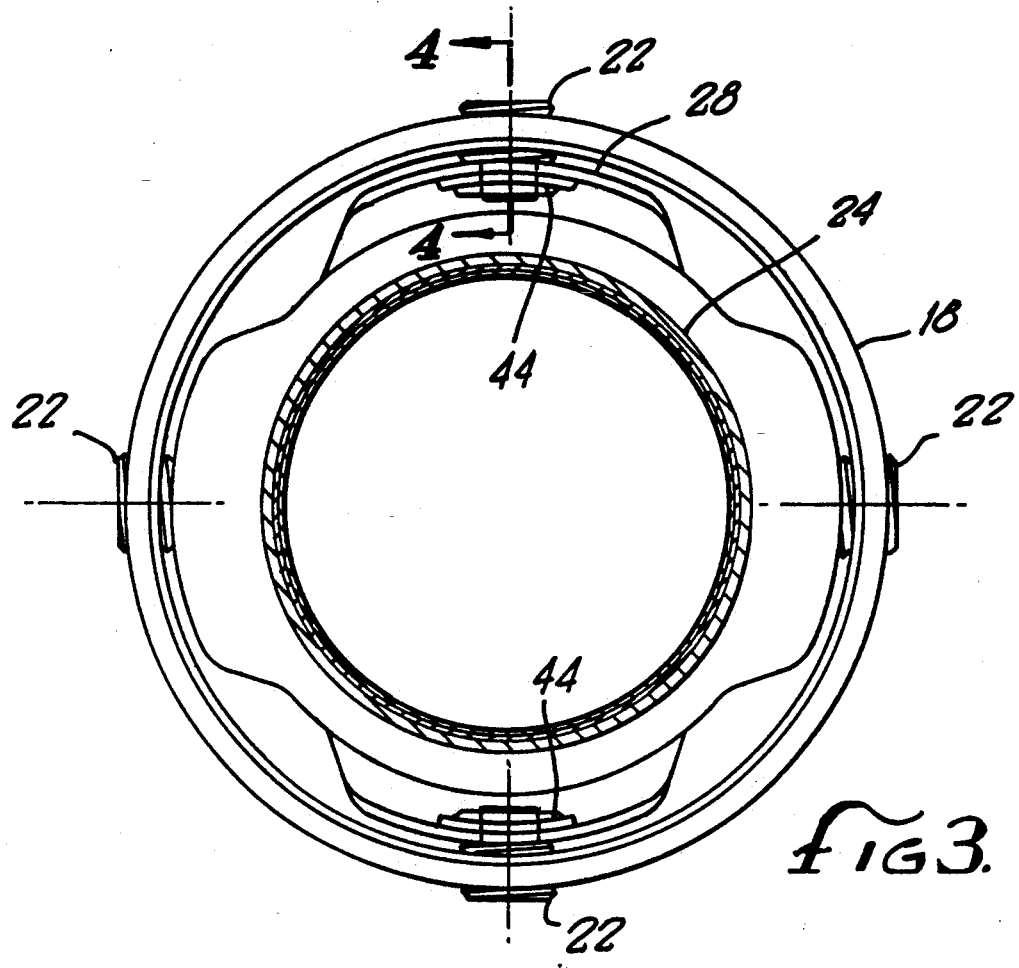
FIG. 3 is a cross-sectional view of the gimbal joint taken along line 3—3 of FIG. 1.

FIG. 1 illustrates a gimbal joint generally designated 10. The gimbal joint 10 joins two sections of ducting 12. Each section of ducting 12 has a central axis 14. The gimbal joint 10 includes at least one pair of opposing pivot means 16 and a retaining ring 18, which forms a part of each pivot means 16 as shown in FIG. 3. In addition to the retaining ring 18, each pivot means also includes a clevis 20 and a pivot pin 22. The pivot pin 22 fits through the retaining ring 18 and through the clevis 20 to form the pivot means 16.

Each clevis 20 is composed of an annular collar 24, a flared portion 26 and a flat portion 28. The collar 24 of the clevis 20 has a first bend 19 that connects it to the flared portion 26. The flared portion 26 has a second bend 21 that connects it to the flat portion 28. The collar 24 of the clevis 20 is attached to the ducting 12 by weld 30. The flared portion 26 flares outwardly from the collar 24 so that the distance 32 of the flat portion 28 from the central axis 14 of the ducting 12 is greater than the radius 34 of the collar 24.

The flat portion 28 of the clevis 20 has a lubricating bore 36 formed therein for receiving the pivot pin 22. The lubricating bore 36 has an inner surface 38. The inner surface 38 of the lubricating bore 36 interacts with the pivot pin 22 to reduce friction as is discussed in more detail below.

In addition, the flat portion 28 of the clevis 20 has a top surface 40 and an bottom surface 42. The bottom surface 42 has a doubler or strengthening collar 44 extending therefrom. The strengthening collar 44 surrounds, but does not cover, the lubricating bore 36. In this way, the strengthening collar 44 forms a part of the lubricating bore 36 and receives the pin 22 within it.

Formed within the ring 18 are one or more transverse bores 46 for receiving the pivot pin 22. The pivot pin 22 extends through the transverse bore 46 in the ring 18 and into the lubricating bore 36 in the flat portion 28 of the clevis 20 thereby forming the gimbal joint 10.

The pivot pin 22 consists of a head portion 48 and a rod portion 50. The head portion 48 of the pivot pin 22 has a radius 52 and the rod portion 50 has a radius 54. The radius 52 of the head portion 48 should be greater than the radius 54 of the rod portion 50 for reasons that will become apparent.

The head portion 48 has a top surface 56, a bottom surface 58, a cylindrical surface 60, and a central axis 62. Formed in the cylindrical surface 60 of the head portion 48 are exterior threads 64. To receive the threads 64 in the head portion 48, the transverse bore 46 extending through the ring 18 has an interior surface 66. Formed within the interior surface 66 is complementary threading 68 for receiving the exterior threads 64 of the head portion 48. In the top surface 56 of the head portion 48, there is a slot means 70 formed therein for screwing the pivot pin into the retaining ring 18. A weld bead 72 secures the pivot pin 22 in place.

Figure 4:
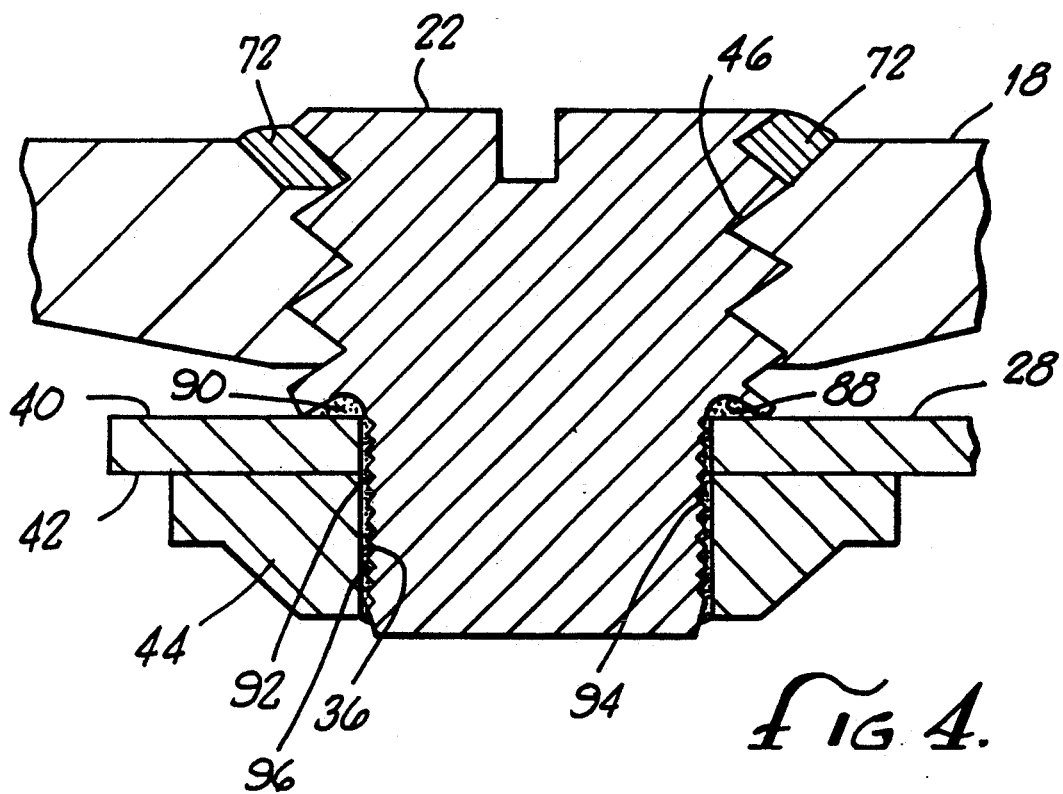
FIG. 4 is an enlarged cross-sectional view of the invention installed in the gimbal joint taken along line 4—4 of FIG. 3.
Figure 5:
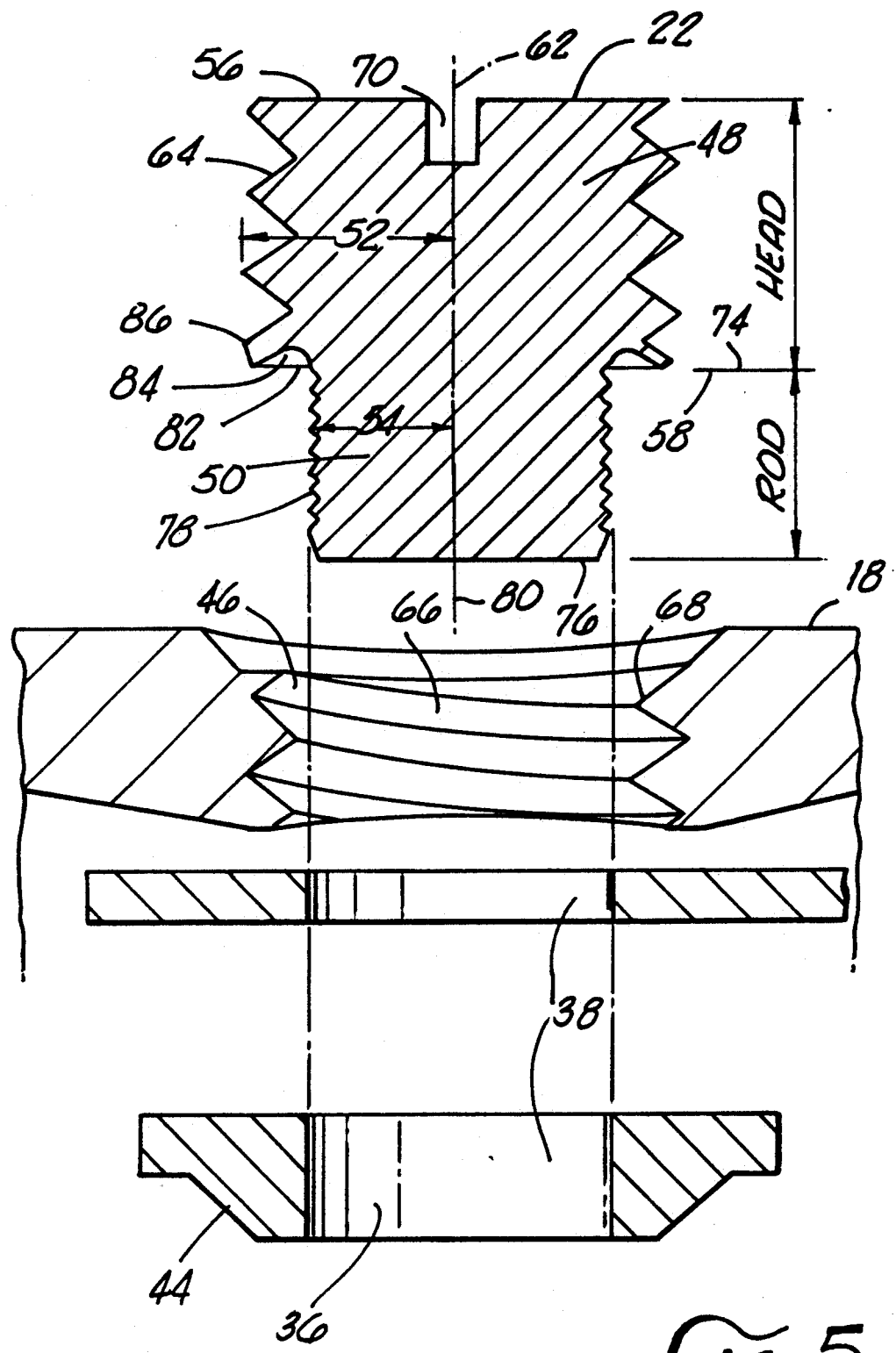
FIG. 5 is an exploded view of FIG. 4.

The rod portion 50 has a top surface 74, a bottom surface 76, a cylindrical surface 78, and a central axis 80. The top surface 74 of the rod portion 50 is flush with, and integrally formed with, the bottom surface 58 of the head portion 48. In addition, the central axis 62 of the head portion 48 is in alignment with the central axis 80 of the rod portion 50. Since the radius 52 of the head portion 48 is greater than the radius 54 of the rod portion 50, there is an overhang 82 created by the difference in radii between the rod portion 50 and head portion 48. The overhang 82 is turned to form an annular recess 84 with a terminal end 86. When the pivot pin 22 is installed in the pivot means as shown in FIG. 4, the terminal end 86 of the annular recess 84 contacts the surface of the ring 18. As a result, the annular recess 84 and the ring 18 define the boundaries of a cavity or reservoir 88. This cavity 88 is used as a reservoir for lubricant 90. The reservoir 88 is in communication with a lubricating space 92. The lubricating space 92 is defined as the space between the inner surface 38 of the bore and the cylindrical surface 78 of the rod portion 50.

In the preferred embodiment, the cylindrical surface 78 of the rod portion 50 has texturing 94. When the rod portion 50 is inserted into the lubricating bore 36, pockets 96 are created between the cylindrical surface 78 of the rod portion 50 and the inner surface 38 of the lubricating bore 36 because of the irregular surface caused by the texturing 94. Collectively, these pockets 96 define the lubricating space 92. These pockets 96 allow lubricant from the reservoir 88 to leak in between the cylindrical surface 78 of the rod portion 50 and the inner surface 38 of the lubricating bore 36. The texturing 94 on the cylindrical surface 78 of the rod portion 50 also helps trap lubricant so that it does not all leak out. In this way, the pivot pin is lubricated.

In another embodiment of the invention, the textured surface may be on the inner surface 38 of the lubricating bore 36. This approach would also effectively trap lubricant in the lubricating bore 36.

In yet another embodiment of the invention, a double clevis (not shown) may be used. A double clevis has two flat portions parallel to each other extending from said flared portion of the clevis. The retaining ring passes between the two flat portions of the double clevis. The pivot pin extends through the resulting structure.

The frictional forces within the joint 10 can be mitigated further by using alloys of different hardnesses for the pivot pin 22 and for the inner surface 38 of lubricating bore 36 into which the pivot pin 22 fits. For example, a cobalt alloy with high lubricity such as L-605 (AMS 5537E), can be used to make the pivot pin 22 and a case hardened nickle alloy, such as Inconel 718 (AMS 5662F, 5663G, 5664B), can be used to make the inner surface 38 of the lubricating bore 36. Since the cobalt alloy is relatively soft and has high lubricity compared to the nickel alloy, the pivot pin 22 will suffer the greater wear. One can also obtain satisfactory results if the inner surface 38 of the lubricating bore 36 is composed of the softer alloy and the pivot pin 22 is composed of the harder alloy. In either case, the difference in hardness of the two metals and lubricity of at least one avoids the greater stresses caused by two metals of equal hardnesses and no lubricity wearing against each other.

To prevent gases from leaking out of the gimbal joint when under high pressure, bellows 98 may be installed within the joint. See U.S. Pat. No. 3,241,868.

The invention and its attendant advantages will be understood from the foregoing description and it will be apparent that various changes may be made without departing from the spirit of the invention.

We claim:

1. In a gimbal joint for use in ducting to achieve bending fluctuations of said ducting, said joint including an annular first clevis secured to one end of a first piece of ducting and an annular second clevis secured to an end of a second piece of ducting, a flexible bellows uniting said first and second piece of ducting, each clevis including an end pin receiving portion that runs parallel to the plane of said ducting it is attached to, a retaining ring surrounding said end pin receiving portions of said clevises, said ring having a pair of opposed transverse threaded bores formed therethrough, each pair of bores being spaced 90° from the other around said ring, each end pin receiving portion including a bore therethrough aligned with one of said transverse threaded bores and having an annular surface; a pivot pin having a threaded head portion and a rod portion with said head portion of a greater diameter than said rod portion forming an overhang relative to said rod portion, said rod portion having an annular surface spaced from said bore annular surface, and said head portion threaded into said transverse threaded bore and fixedly secured therein with said rod extending into said bore whereby said gimbal joint is formed maintaining said first and second pieces of ducting together in bendable pivotable relationship about said pivot pins, the apparatus comprising:

each of said rods being of a diameter when interfitted within said respective transverse bores that a lubricating space is created between the respective annular surfaces of said bore and said rod;

a recess formed in said overhang of said head portion communicating with said lubricating space when said head portion is threaded into said threaded bore and said pin is in a fixed position within the retaining ring with said head overhang biased against said end pin receiving portion of said clevis, and said recess defining a lubricant reservoir adapted to receive a lubricant and allow the lubricant to pass into said lubricating spaces to assure self lubrication and pivoting of said opposed clevises about said opposed pivot pins.

2. In a gimbal joint assembly of claim 1 wherein said recess formed in said overhang is annular.

3. In a gimbal joint assembly of claim 1 wherein said annular surface of said rod portion of said pivot pin has a textured surface whereby retention of lubricant in said lubricating space is increased.

4. In a gimbal joint assembly of claim 1 wherein said annular surface of said lubricating bore is textured whereby retention of lubricant in said lubricating space is increased.

5. In a gimbal joint assembly of claim 1 wherein:
said annular surface of said rod portion is comprised of a metal alloy of one hardness and
said annular surface of said transverse bore is comprised of a metal alloy of a different hardness than said metal alloy of said rod.

6. In a gimbal joint assembly of claim 5 wherein:
said metal alloy of said annular surface of said rod portion is a cobalt alloy with high lubricity and
said metal alloy of said annular surface of said rod of said pivot pin is case hardened nickel alloy.

7. In a gimbal joint assembly of claim 5 wherein:
said metal alloy of said annular surface of said rod portion is case hardened nickel alloy; and
said metal alloy of said annular surface of said rod of said pivot pin is a cobalt alloy with high lubricity.

* * * * *